United States Patent
Babazadeh

(10) Patent No.: US 9,806,621 B1
(45) Date of Patent: Oct. 31, 2017

(54) METHOD AND APPARATUS FOR PHASE ALIGNMENT IN SEMI-RESONANT POWER CONVERTERS

(71) Applicant: Infineon Technologies Austria AG, Villach (AT)

(72) Inventor: Amir Babazadeh, Laguna Hills, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/154,520

(22) Filed: May 13, 2016

(51) Int. Cl.
*H02M 7/537* (2006.01)
*H02M 3/335* (2006.01)
*H02M 1/08* (2006.01)
*H02M 1/44* (2007.01)

(52) U.S. Cl.
CPC ......... *H02M 3/33507* (2013.01); *H02M 1/08* (2013.01); *H02M 1/44* (2013.01)

(58) Field of Classification Search
CPC ........ H02M 3/28; H02M 3/335; H02M 3/315; H02M 3/33507; H02M 3/33569; H02M 3/33523; H02M 1/083; H02M 1/32; H02M 2007/4815; H02M 2007/4818; H02M 3/3155; H02M 3/325; H02H 7/122; H02H 7/48; H02H 7/537; H02H 7/715; H02H 7/515; H02H 7/538466; H02H 7/757
USPC ....... 363/20, 21.01, 21.02, 21.03, 55, 56.01, 363/71, 95, 97, 131
See application file for complete search history.

(56) References Cited

U.S. PATENT DOCUMENTS

| | | | |
|---|---|---|---|
| 6,486,642 B1 | 11/2002 | Qian | |
| 7,321,224 B2 | 1/2008 | Iwamoto et al. | |
| 9,350,244 B2 * | 5/2016 | Tang | H02M 3/158 |
| 2002/0118000 A1 | 8/2002 | Xu et al. | |
| 2010/0013307 A1 | 1/2010 | Heineman et al. | |
| 2010/0013451 A1 | 1/2010 | Nakamura et al. | |
| 2011/0254526 A1 | 10/2011 | Luo et al. | |
| 2012/0249102 A1 | 10/2012 | Cuk | |
| 2014/0293360 A1 * | 10/2014 | Inukai | G03G 15/5004 358/302 |
| 2015/0115911 A1 | 4/2015 | Parto et al. | |

(Continued)

OTHER PUBLICATIONS

Hwu, K. I. et al., "Ultrahigh Step-Down Converter", IEEE Transactions on Power Electronics, vol. 30, No. 6, Jun. 2015, pp. 3262-3274.

*Primary Examiner* — Adolf Berhane
(74) *Attorney, Agent, or Firm* — Murphy, Bilak & Homiller, PLLC

(57) ABSTRACT

Each phase of a multi-phase voltage converter includes a power stage, passive circuit, synchronous rectification (SR) switch, and control circuit. Each passive circuit couples its power stage to an output node of the voltage converter, and is switchably coupled to ground by the SR switch. The current through the SR switch has a half-cycle sinusoidal shape with a resonant frequency determined by the reactance of the passive circuit. The control circuit generates signals to control switches within the power stage and the SR switches. The control circuit measures current through the SR switch of each phase, and adjusts the duty cycles of the control signals for the phases so that the SR switches are switched off when zero or almost zero current is flowing through them.

20 Claims, 9 Drawing Sheets

(56) References Cited

U.S. PATENT DOCUMENTS

| | | | |
|---|---|---|---|
| 2015/0264769 A1* | 9/2015 | Jelaca | H05B 33/0845 |
| | | | 315/206 |
| 2016/0145062 A1* | 5/2016 | Kamatani | H02P 6/16 |
| | | | 271/275 |
| 2016/0254766 A1* | 9/2016 | Brown | H02P 6/182 |
| | | | 318/400.35 |
| 2016/0336873 A1* | 11/2016 | Ayai | H02M 3/33576 |
| 2017/0063227 A1* | 3/2017 | Nakamura | H02M 3/158 |
| 2017/0104422 A1* | 4/2017 | Okumura | H02M 7/487 |

* cited by examiner

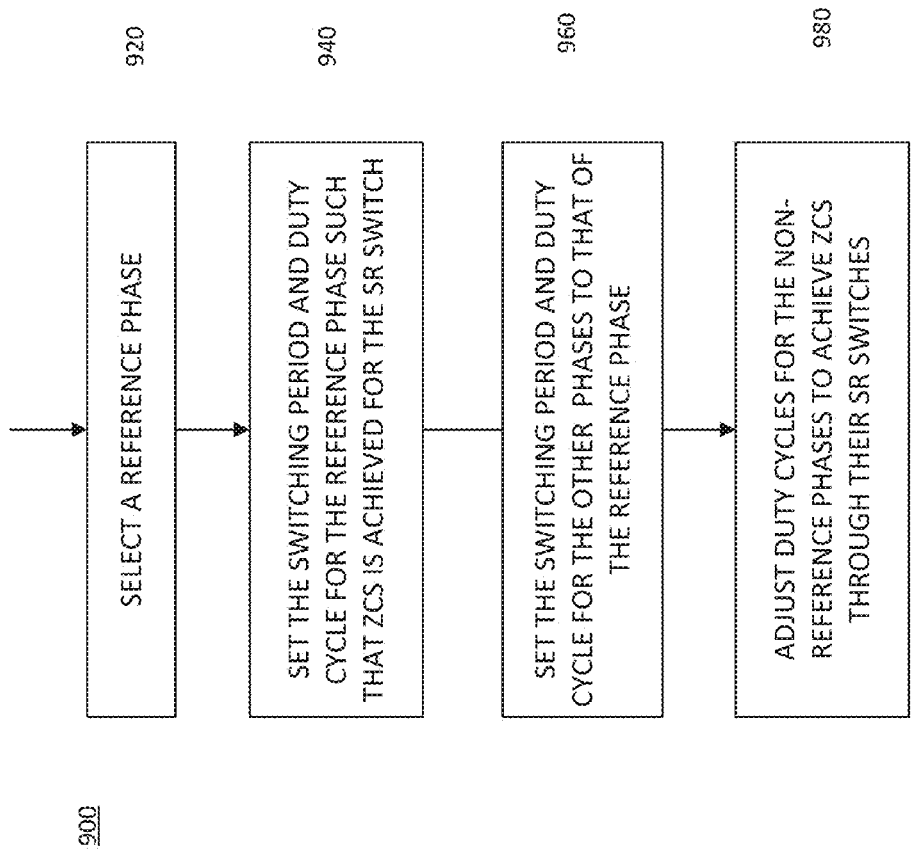

METHOD AND APPARATUS FOR PHASE ALIGNMENT IN SEMI-RESONANT POWER CONVERTERS

TECHNICAL FIELD

The present application relates to multi-phase semi-resonant and resonant converters and, in particular, relates to techniques for aligning the timing of switch control signals for the phases of such a converter.

BACKGROUND

Resonant and semi-resonant DC-DC converters, including isolated and non-isolated topologies, are used in a variety of applications including telecommunications, consumer electronics, computer power supplies, etc. The usage of such converters is gaining popularity because of their zero-voltage switching (ZVS) and/or zero-current switching (ZCS) characteristics, and their ability to utilize parasitic electrical properties inherent in an electronic circuit. Among numerous topologies, the semi-resonant converter with transformer/center-tapped inductor is an attractive topology for providing high voltage-conversion ratios without requiring isolation. Such converters provide advantages including lower cost and higher efficiency as compared to other solutions.

One class of semi-resonant converters includes high-side and low-side switches that transfer power from an input source to a center-tapped inductor that supplies output power to a load. The center-tapped inductor is also connected to a second low-side switch, which is termed a synchronous rectification (SR) switch herein. In order to meet the power requirements for a load of a semi-resonant converter (e.g., provide a near constant output voltage for the load), many semi-resonant DC-DC converters employ a variable switching frequency wherein the switching period can vary from cycle to cycle. During a portion of each switching period, the SR switch will be enabled such that current flows through it. For the semi-resonant converter described above, the current during this portion of a switching period will be shaped like one half cycle of a sinusoidal period. The time interval for this half-cycle sinusoid is determined by reactive elements within passive circuitry of the semi-resonant converter, e.g., the natural frequency of an inductor/capacitor (LC) resonant tank and other passive components within the semi-resonant DC-DC converter determine this time interval.

It is highly desirable to turn the power switches of a resonant or semi-resonant DC-DC converter on and off when the voltage or current across the relevant switch is at or near zero. Such soft switching has an advantage that switch losses are minimized and, as a result of this, soft-switching resonant and semi-resonant converters can run at much higher efficiencies than hard-switching voltage converters. Additionally, soft switching avoids electromagnetic interference (EMI) that is due to high-frequency harmonics associated with hard switching.

The time interval of the half-cycle sinusoidally-shaped current flowing through an SR switch within a semi-resonant converter determines when the SR switch should be disabled. In order to achieve the desired zero current switching (ZCS), the SR switch should be disabled when this current has returned to zero. The reactive components of the semi-resonant converter determine this time interval. While this time interval may be calculated based upon the inductive and capacitive elements in the circuit, such a calculated time interval will not be perfect due to variations in the reactive elements. More particularly, inductor and capacitor components vary from one to another (as indicated by the tolerance typically assigned to such components), the inherent (parasitic) reactance of the circuit introduces variation, and temperature changes can alter the reactance of some components.

In order to minimize voltage and current ripple at the output of a voltage converter and to scale up its power output, a voltage converter may make use of multiple phases. The phases are each, effectively, separate voltage converters wherein each is tied to a common input voltage source and powers a common output load. To maintain stability and minimize the ripple, the phases should be driven by a common switching frequency, but with the switch control signals to each of the phases staggered in time.

A problem with multi-phase semi-resonant converters is that the time interval of the half-cycle sinusoidally-shaped current will vary from one phase to another due to variations in the inductance and capacitance within each of the phases. A controller using a common (but variable) switching frequency for all of the phases, and staggered versions of a control signal to drive the SR switches for each phase of a semi-resonant converter, will not achieve the zero-current switching (ZCS) described earlier. More particularly, the time interval of the half-cycle sinusoidally-shaped current for some phases of the semi-resonant voltage converter may be relatively short whereas others may be relatively long. This means the controller may disable SR switches for some phases while positive current is still flowing through the SR switches, and may disable other SR switches when negative current is flowing through these SR switches. The efficiency of the multi-phase semi-resonant converter is reduced due to the inability to achieve ZCS for the SR switch in every phase of such a voltage converter.

Accordingly, there is a need for improved techniques that avoid switching SR switches off in a multi-stage semi-resonant converter when the current flowing through the SR switches for each phase is not zero.

SUMMARY

According to an embodiment of a multi-phase voltage converter, the voltage converter comprises a plurality of phases and a control circuit. Each phase includes a synchronous rectification (SR) switch through which a half-cycle sinusoidal-like current is conducted when the switch is turned on and conducting. The control circuit controls cycle-by-cycle switching of the SR switch in each phase using pulse width modulation (PWM) control signals, wherein each PWM control signal has a switching period and duty cycle. The control circuit selects one of the phases as a reference phase, wherein the switching period and duty cycle of the PWM control signal for the reference phase are set such that the half-cycle sinusoidal-like current conducted by the SR switch of the reference phase crosses zero (or nearly crosses zero) at a time instant when the SR switch is turned off for each switching cycle. Next, the switching period and duty cycle of the PWM control signals for the other phases are set to those of the reference phase. The control circuit then adjusts the duty cycle of the PWM control signal for each of the other phases such that the half-cycle sinusoidal-like currents conducted by the SR switches of the other phases cross zero (or nearly cross zero) when the SR switches are turned off for each switching cycle.

According to an embodiment of a method, a method is provided for aligning the phases in a multi-stage voltage converter. Each phase of the multi-phase voltage converter includes a synchronous rectification (SR) switch through which a half-cycle sinusoidal-like current is conducted when the SR switch is turned on. The method is performed by controlling cycle-by-cycle switching of each phase via pulse width modulation (PWM) control signals, wherein each PWM control signal has a switching period and a duty cycle. One of the phases is selected as a reference phase, and the switching period and duty cycle of the PWM control signal for the reference phase are set such that the half-cycle sinusoidal-like current conducted by the SR switch of the reference phase crosses zero (or nearly crosses zero) at a time instant when the SR switch is turned off for each switching cycle. Next, the switching period and duty cycle of the PWM control signals for each of the other phases are set to those of the reference phase. The duty cycles of the PWM control signal for each of the other phases are then adjusted such that the half-cycle sinusoidal-like currents conducted by the SR switches of the other phases cross zero (or nearly cross zero) when the SR switches are turned off for each switching cycle.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

FIG. 9 illustrates a flow diagram corresponding to a method for aligning the phases of a multi-phase voltage converter such that zero current switching is achieved through the SR switches in a multi-phase voltage converter.

DETAILED DESCRIPTION

Embodiments described herein provide techniques for aligning the switch timing of power switches within each of the phases in a multi-phase voltage converter, such that synchronous rectification (SR) switches in each phase are not turned off when current is flowing through them. The SR switches are included in a power converter topology that includes a transformer/center-tapped inductor (hereinafter referred to simply as a "center-tapped inductor"), and are used for coupling the center-tapped inductor to ground. Such a topology allows for high voltage-conversion ratios without requiring isolation. Because of its ability to support high voltage-conversion ratios, this topology is particularly appropriate for applications requiring an output power supply that provides a relatively low voltage and a relatively high current. This translates into relatively high current levels flowing through the SR switches including, potentially, significant current levels (positive or negative) when the SR switches are turned off. In order to achieve high efficiency for a voltage converter and to avoid generating excessive electromagnetic interference (EMI), the SR switches should not be turned off while they are still conducting significant current. The techniques described below ensure that the SR switches are only turned off when the current flowing through them is zero or nearly zero.

Various embodiments of multi-phase voltage converter circuits and methods within multi-phase voltage converters will be provided in the following detailed description and the associated figures. The described embodiments provide particular examples for purposes of explanation, and are not meant to be limiting. Features and aspects from the example embodiments may be combined or re-arranged except where the context does not allow this.

Figure 1:
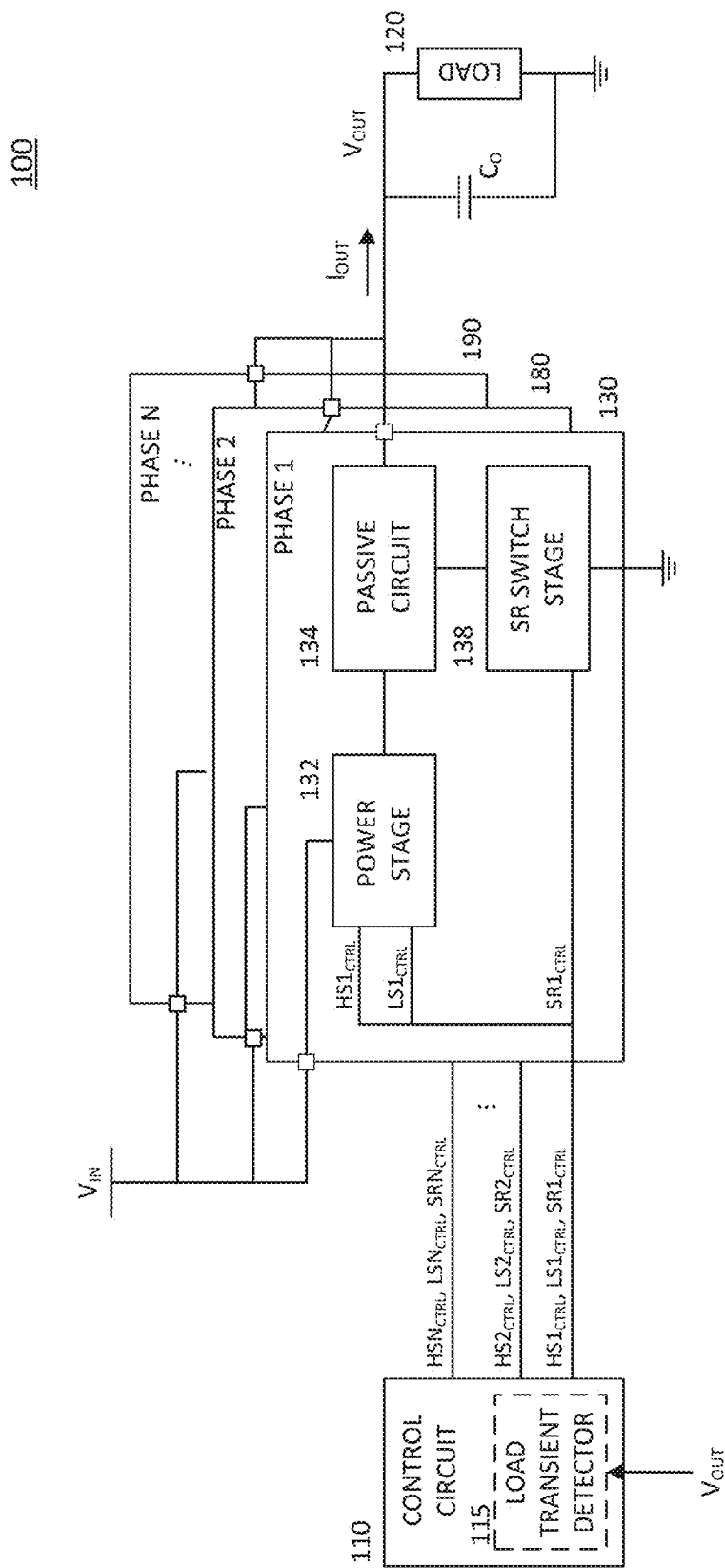
FIG. 1 illustrates a block diagram of an embodiment of a multi-phase voltage converter including a control circuit, wherein each phase includes a power stage, a passive circuit, and a synchronous rectification (SR) switch stage.

FIG. 1 illustrates an embodiment of a multi-stage voltage converter 100 that is configured to input power from a power source $V_{IN}$ and output power for driving a load 120. The voltage converter 100 supplies a current $I_{OUT}$ to the load 120 and to a capacitor $C_O$ that serves to filter an output voltage $V_{OUT}$. The voltage converter of FIG. 1 includes multiple phases 130, 180, 190. Phase 1 (130), which is taken as representative of the multiple phases, is illustrated in block diagram form with the understanding that the other phases would be similarly configured.

As illustrated, phase 1 (130) includes a passive circuit 134 that couples a power stage 132 to the voltage converter output $V_{OUT}$. The power stage 132 inputs switch control signals $HS1_{CTRL}$ and $LS1_{CTRL}$ for controlling switches therein. The switches within the power stage 132 typically require drivers (not shown for ease of illustration). The passive circuit 134 is coupled to a synchronous rectification (SR) switch stage 138, which serves to switchably couple the passive circuit 134 to ground. The SR switch stage 138 includes an SR switch (not shown), which also typically requires a driver (not shown for ease of illustration).

A control circuit 110 controls the switches of the power stage and the SR switch stage for each of the phases of the voltage converter 100. The control circuit 110 determines a switching frequency for the voltage converter based upon the load requirements, and drives switch control signals (e.g., $HS1_{CTRL}$, $LS1_{CTRL}$, $SR1_{CTRL}$) for each of the phases of the voltage converter 100. These control signals are typically pulse-width-modulated (PWM) waveforms, each of which is driven with a frequency and duty cycle determined by the control circuit 110 based upon the requirements of the load 120. The control circuit 110 includes a load transient detector 115, which will typically input the output voltage $V_{OUT}$, or a measurement thereof, for purposes of detecting load transients. The switching frequency of the voltage converter 100 is variable and changes as the load requirements change.

The control circuit 110 may be implemented using analog hardware components (such as transistors, amplifiers, diodes, and resistors), may be implemented using processor circuitry including primarily digital components, or may be implemented using a combination of analog hardware components and processor circuitry. The processor circuitry may include one or more of a digital signal processor (DSP), a general-purpose processor, and an application-specific integrated circuit (ASIC). The control circuit 110 may also include memory, e.g., non-volatile memory such as flash, that includes instructions or data for use by processor circuitry. The control circuit 110 inputs several sensor signals (e.g., $I_{OUT}$, $V_{OUT}$, current measurements for the SR switch stages of each phase) to estimate the power requirements for the load 120 and to otherwise aid in the generation of the switch control signals.

In order to maintain stability and reduce ripple at the output $V_{OUT}$ of the voltage converter 100, the multiple phases of the voltage converter 100 are typically driven using the same switching frequency during a switch cycle of the voltage converter 100. The control circuit 110 determines the load requirements at a given point in time. Based upon these load requirements and, possibly, the switching frequency for the current cycle, the control circuit 110 will determine a switching frequency (and associated time period) for an upcoming (next) cycle. For a leading phase of the voltage converter, this upcoming switch frequency (and associated time period) is used to generate the PWM waveforms for each of the switches in the leading phase (e.g., $HS1_{CTRL}$, $LS1_{CTRL}$, $SR1_{CTRL}$) for the upcoming switch cycle. Versions of these PWM waveforms that are delayed (staggered) in time are used to drive the switches in the other (non-leading) phases of the voltage converter for the upcoming switch cycle. The control circuit 110 repeats this process for each switch cycle. To further explain this timing, a circuit implementation for a single phase, e.g., phase 1 (130), of the voltage converter 100 will now be described followed by a description of the switch timing used in the single phase. This description will then be extrapolated to multiple phases of the voltage converter 100.

Techniques for determining the switching frequency and duty cycles based upon the load requirements of a voltage converter are, generally, well-known in the art. Such conventional techniques will not be further elaborated upon herein, in order to avoid obfuscating the unique aspects of the invention, which are described.

Figure 2:
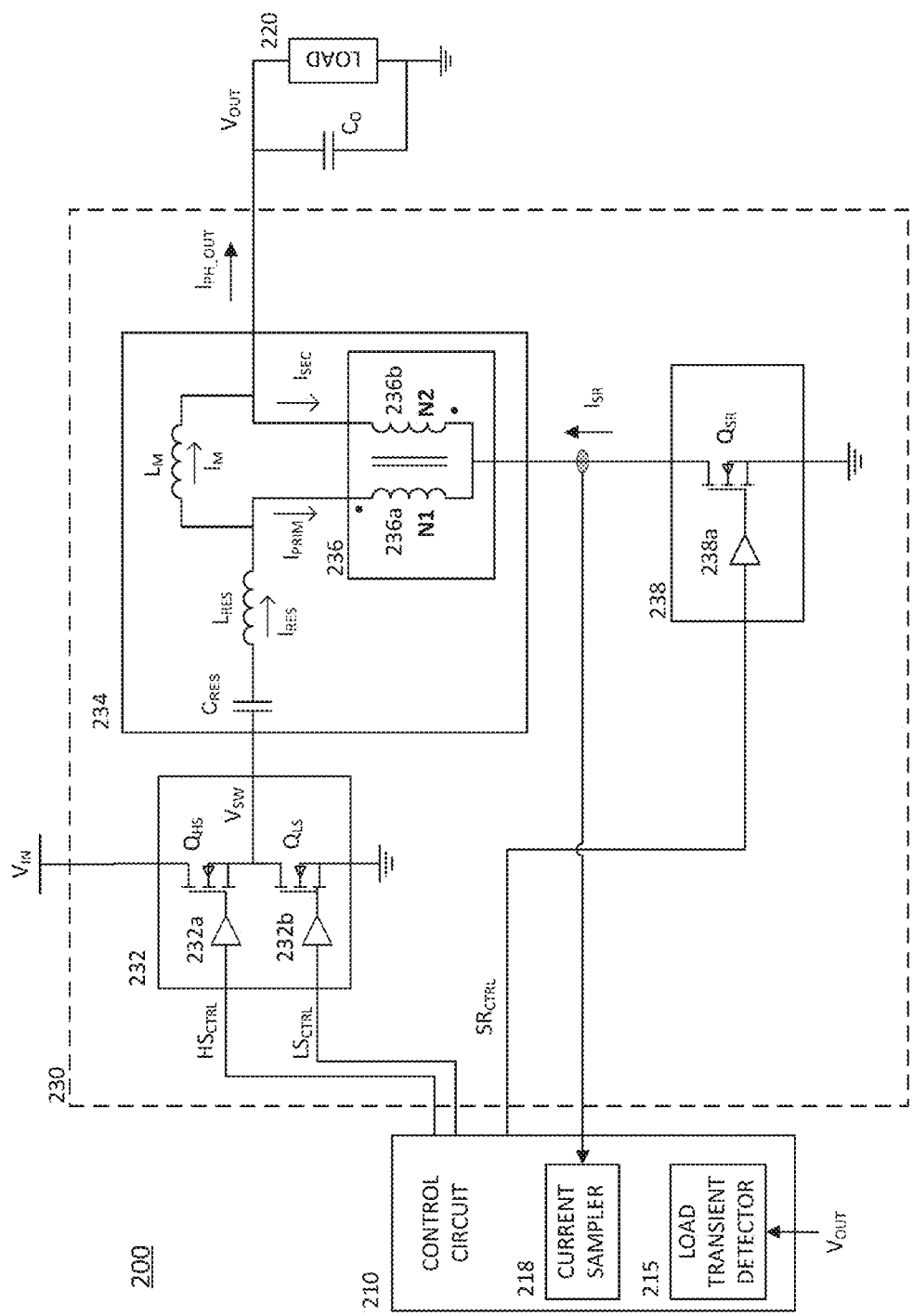
FIG. 2 illustrates a circuit diagram of an embodiment for one phase of a voltage converter such as that illustrated in FIG. 1.

FIG. 2 illustrates a circuit diagram 200 that shows one phase 230 of a voltage converter such as that illustrated in FIG. 1. The phase circuit 230 is replicated to realize a multi-phase voltage converter such as that of FIG. 1. For ease of illustration, such other phases are not shown in FIG. 2, but it is understood that they exist in a multi-stage voltage converter and that their circuitry is similar or equivalent to the phase circuit 230 that is shown.

An input voltage $V_{IN}$ is provided to a power stage 232 at a high-side switch $Q_{HS}$ that is coupled to a low-side switch $Q_{LS}$ at a switching node $V_{SW}$. The low-side switch $Q_{LS}$ is, in turn, connected to ground. Each of these switches $Q_{HS}$, $Q_{LS}$ is controlled by a respective driver 232a, 232b as shown. The switching node $V_{SW}$ of the power stage 232 is coupled to a passive circuit 234, which provides an output current $I_{PH\_OUT}$ and voltage $V_{OUT}$ to a load 220. The passive circuit 234 includes a resonant tank comprised of a capacitor $C_{RES}$ and an inductor $L_{RES}$. The inductor $L_{RES}$ may merely be leakage inductance (e.g., the inherent parasitic inductance of the circuit wiring), or it may be an actual inductor component together with some leakage inductance. Moreover, the inductance represented by $L_{RES}$ is typically variable, because the inductance value will often vary over temperature. The inductor $L_{RES}$ is coupled to a transformer/center-tapped inductor 236 having N1 primary-side windings 236a and N2 secondary-side windings 236b. The turns ratio N2/N1 determines the output/input voltage ratio of the center-tapped inductor 236 when it is conducting current (Conversely, the ratio N1/N2 determines the output/input current ratio of the center-tapped inductor 236.) For the illustrated circuit 230, a magnetizing inductor $L_M$ is connected across the center-tapped inductor 236. An SR switch stage 238 is connected to the center-tapped inductor 236 and serves to couple its center tap to ground when the SR switch stage 238 is conducting. (Note that a "center" tap is not necessarily in the middle of the windings of the center-tapped inductor 236. Typically, the windings N1 and N2 will be different to achieve the desired step-down or step-up voltage conversion.) The SR switch stage 238 includes an SR switch $Q_{SR}$, and, typically, a driver 238a that is coupled to a control terminal (e.g., a gate) of the SR switch $Q_{SR}$.

The high-side, low-side, and SR switches $Q_{HS}$, $Q_{LS}$, $Q_{SR}$ are shown in FIG. 2 as enhancement-mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches of the power stage 232 and of the SR switch stage 238 (e.g., $Q_{HS}$, $Q_{LS}$, $Q_{SR}$) may be integrated on the same semiconductor die, may each be provided on separate dies, or may otherwise be spread across a plurality of semiconductor dies. The drivers for the switches may be integrated on the same semiconductor die(s) as their corresponding switches, or may be provided on separate dies.

A control circuit 210 generates PWM signals $HS_{CTRL}$, $LS_{CTRL}$, and $SR_{CTRL}$ that are coupled to the drivers 232a, 232b, 238a that control the switches $Q_{HS}$, $Q_{LS}$, $Q_{SR}$ in the circuit 230 for the illustrated phase. The control circuit 210 determines the frequency and duty cycle of the PWM signals $HS_{CTRL}$, $LS_{CTRL}$, $SR_{CTRL}$ so as to meet the power requirements of the load 220. In a semi-resonant voltage converter, such as that illustrated in FIG. 2, the high-side and low-side switches $Q_{HS}$, $Q_{LS}$ of the power stage 232 are controlled such that these switches do not conduct at the same time. A typical switching cycle of the voltage converter phase 230 begins with a "dead time" during which none of the switches $Q_{HS}$, $Q_{LS}$ $Q_{SR}$ are conducting. This is followed by a "$T_{ON}$" period during which the high-side switch $Q_{HS}$ is conducting, but the low-side switch $Q_{LS}$ and the SR switch $Q_{SR}$ are not conducting. A "$T_{OFF}$" period follows this, during which the high-side switch $Q_{HS}$ is not conducting, but the low-side switch $Q_{LS}$ and the SR switch $Q_{SR}$ are conducting.

The control circuit 210 includes a load transient detector 215 that functions similarly to the load transient detector 115 of FIG. 1. Additionally, the control circuit 210 inputs a measurement of the current for the SR switch $Q_{SR}$ using a current sampler 218.

Figure 3:
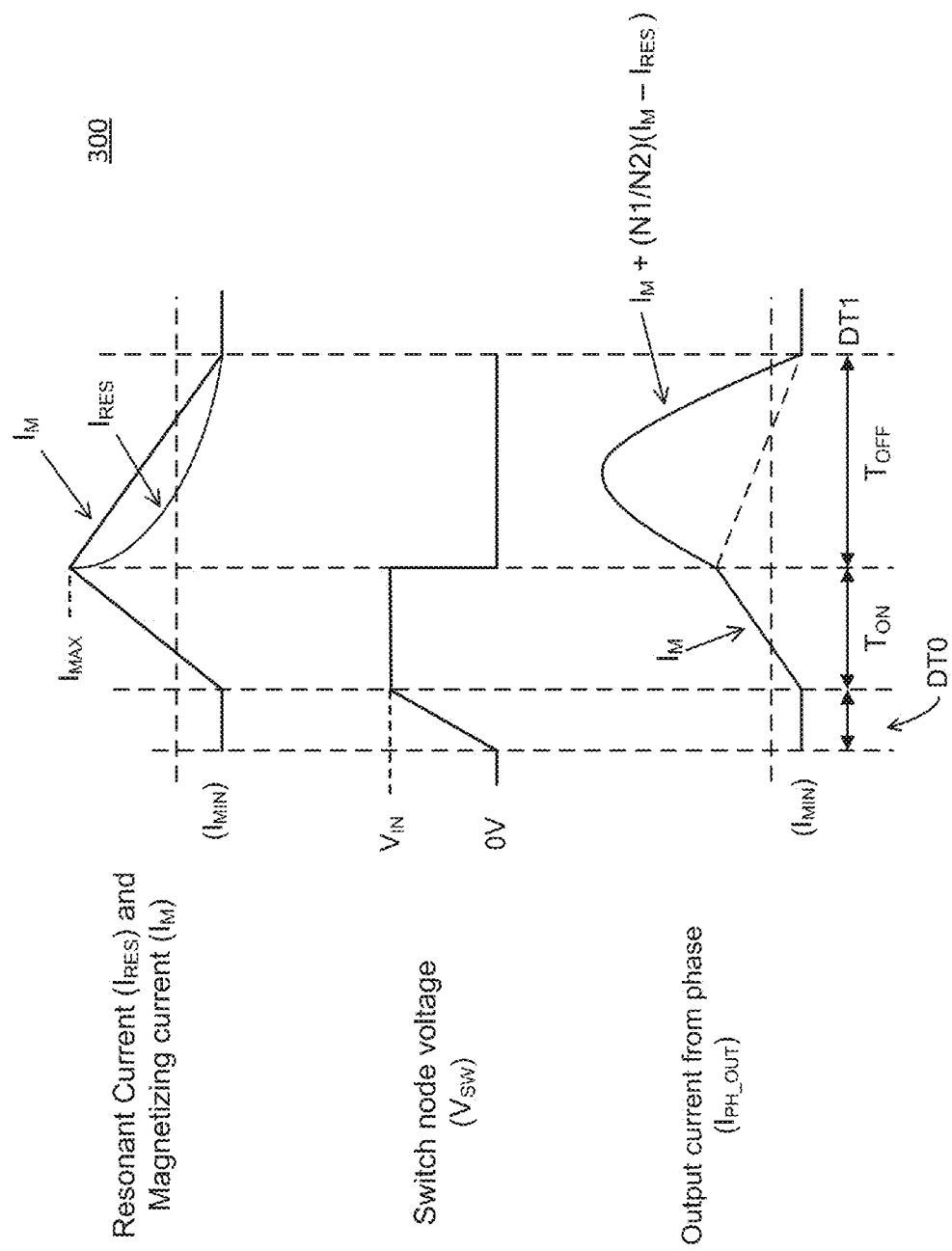
FIG. 3 illustrates voltage and current waveforms as might be generated in one phase of a semi-resonant voltage converter such as that shown in FIG. 1.

FIG. 3 illustrates waveforms 300 for the output current $I_{PH\_OUT}$ from the phase circuit 230, the voltage at the switch node $V_{SW}$, and the resonant and magnetizing currents $I_{RES}$, $I_M$ of the voltage converter 200 during a switch cycle. At the start of a dead time period DT0, the phase output current $I_{PH\_OUT}$ and the magnetizing current $I_M$ are at a minimum value $I_{MIN}$, which is negative. None of the power switches $Q_{HS}$, $Q_{LS}$, $Q_{SR}$ are conducting during the dead time DT0, i.e., the control circuit 210 generates PWM signals $HS_{CTRL}=0$, $LS_{CTRL}=0$, $SR_{CTRL}=0$. The negative current $I_{MIN}$ charges the output capacitance of the low-side switch $Q_{LS}$ and causes the switch node voltage $V_{SW}$ to rise to a level near $V_{IN}$ during the dead time DT0. At the end of the dead time DT0, the high-side power switch $Q_{HS}$ is turned on whereas the low-side switch $Q_{LS}$ and SR switch $Q_{SR}$ remain off, e.g., by setting $HS_{CTRL}=1$, $LS_{CTRL}=0$, and $SR_{CTRL}=0$ at the end of DT0. This state is maintained for an interval of time denoted "$T_{ON}$." During $T_{ON}$, the switch node voltage $V_{SW}$ is tied to $V_{IN}$ through the high-side power switch $Q_{HS}$, and the phase output current $I_{PH\_OUT}$ and the magnetizing current $I_M$ of the voltage converter phase 230 rise in a linear manner, e.g., until the magnetizing current $I_M$ reaches a maximum value $I_{MAX}$. The magnetizing current $I_M$ associated with the LC tank formed by the resonance capacitor $C_{RES}$, the inductor $L_{RES}$ and the magnetizing inductor $L_M$ accounts for the rise in the phase output current $I_{PH\_OUT}$ during $T_{ON}$. (With the SR switch $Q_{SR}$ disabled, almost no current flows through the center-tapped inductor 236 meaning that magnetizing current $I_M \approx I_{RES}$.)

During the next interval of the switching cycle, denoted as "$T_{OFF}$," the high-side switch $Q_{HS}$ is turned off, while the low-side switch $Q_{LS}$ and the SR switch $Q_{SR}$ are turned on, e.g., by setting $HS_{CTRL}=0$, $LS_{CTRL}=1$, and $SR_{CTRL}=1$. The switch node voltage $V_{SW}$ drops to and remains at zero during the $T_{OFF}$ interval, because the switch node $V_{SW}$ is coupled to ground though the low-side switch $Q_{LS}$. Also during the $T_{OFF}$ interval, a resonance is formed between resonance capacitor $C_{RES}$ and inductor $L_{RES}$, and results in a resonant current $I_{RES}$. A portion of this current, i.e., $I_{PRIM}=I_{RES}-I_M$, flows through into the primary-side winding 236a of the center-tapped inductor 236, and leads to a current $I_{SEC}=(N1/N2)*(I_{RES}-I_M)$ flowing through the secondary-side winding 236b of the center-tapped inductor 236. The output current $I_{PH\_OUT}$ of the phase 230 is, thus, the current $I_M$ flowing through the magnetizing inductor $L_M$ minus the current $I_{SEC}$ flowing through the secondary-side winding 236b, i.e., $I_{PH\_OUT}=I_M-(N1/N2)*(I_{RES}-I_M)=I+(N1/N2)*(I_M-I_{RES})$. If the interval $T_{OFF}$ is optimized with respect to the resonant frequency, the SR switch $Q_{SR}$ can be turned off when its current is substantially zero in order to achieve soft-switching of the SR switch $Q_{SR}$.

The current $I_{PH\_OUT}$ that is output by the voltage converter phase 230 initially rises during $T_{OFF}$, as given by $I_{PH\_OUT}=I_M+(N1/N2)(I_M-I_{RES})$, and subsequently falls. This current takes on the shape of the positive half of a sinusoidal cycle. The time instant at which $I_{RES}$ and $I_M$ are equal represents the point at which current stops flowing through the center-tapped inductor 236, i.e., all of the current $I_{RES}$ is flowing through the magnetizing inductor $L_M$. With no current flowing through the primary-side winding 236a of the center-tapped inductor, no current is induced on the secondary-side winding 236b and, hence, no current flows through the SR switch $Q_{SR}$. Ideally, both the low-side switch $Q_{LS}$ and the SR switch $Q_{SR}$ are turned off at this instant, and the dead time DT1 for the next cycle begins, i.e., the switches $Q_{HS}$, $Q_{LS}$, $Q_{SR}$ are all disabled by setting $HS_{CTRL}=0$, $LS_{CTRL}=0$, and $SR_{CTRL}=0$.

Figure 4:
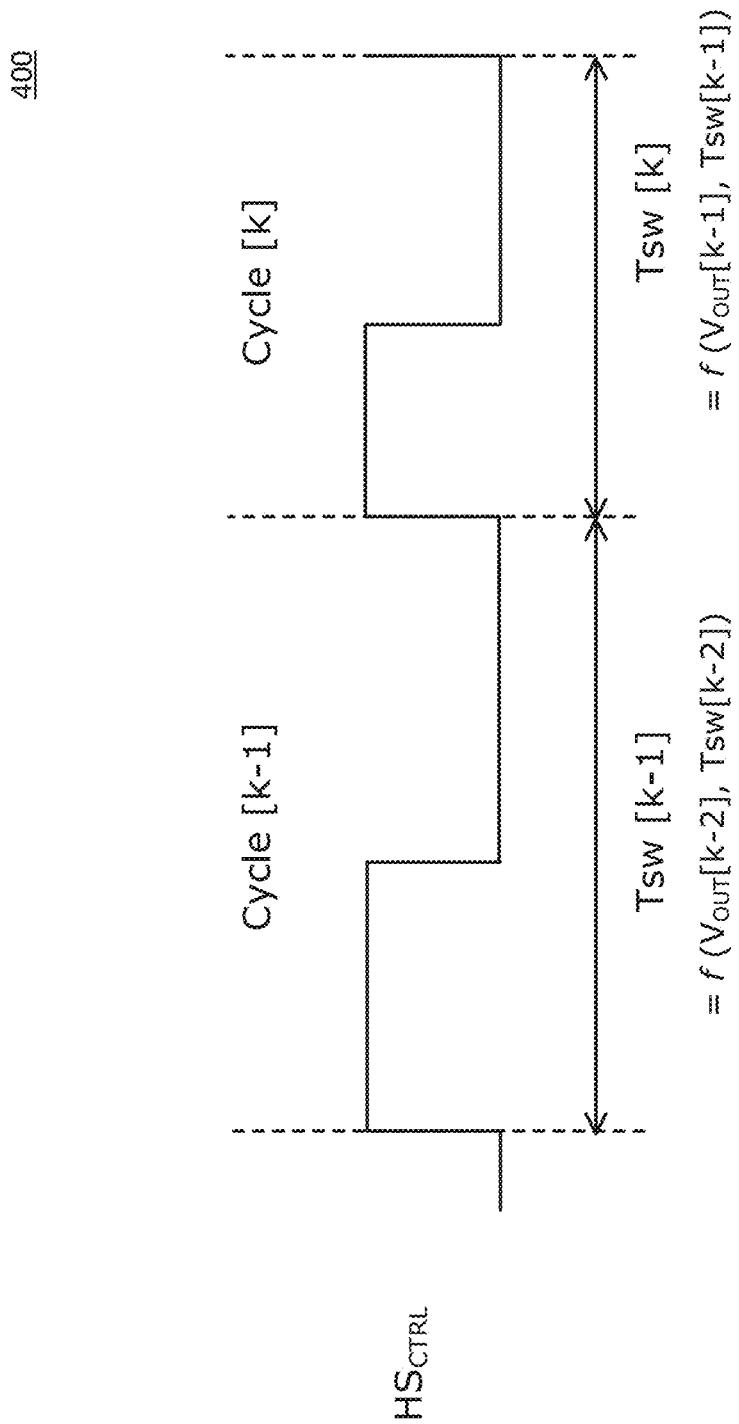
FIG. 4 illustrates a pulse-width-modulated (PWM) waveform as might be used to control a high-side control switch in a variable-frequency voltage converter such as that shown in FIG. 1.

FIG. 4 illustrates a waveform 400 corresponding to the timing of the control signal $HS_{CTRL}$ for a high-side switch $Q_{HS}$ such as that shown in FIG. 2. The voltage converter 200 of FIG. 2, and the control circuit 210 therein, use a variable switching frequency to accommodate variations in the power requirements of the load 220. For a given switch cycle k of the voltage converter 200, the control circuit 210 determines a switching period Tsw[k] based upon measurements taken in the previous cycle (k−1). The measurements estimate the load's power requirements by measuring or estimating, e.g., the output voltage $V_{OUT}$ of the voltage converter 200. For example and as shown in FIG. 4, the switching period Tsw[k] may be a function of an output voltage $V_{out}$ that is measured in cycle (k−1). The switching period Tsw[k] for the current switch cycle may also be based upon the switching period Tsw[k−1] of the previous switch cycle, i.e., the switch period Tsw[k] for the current cycle may be determined by adjusting the switch period Tsw[k−1] from the previous switch cycle (k−1).

Figure 5:
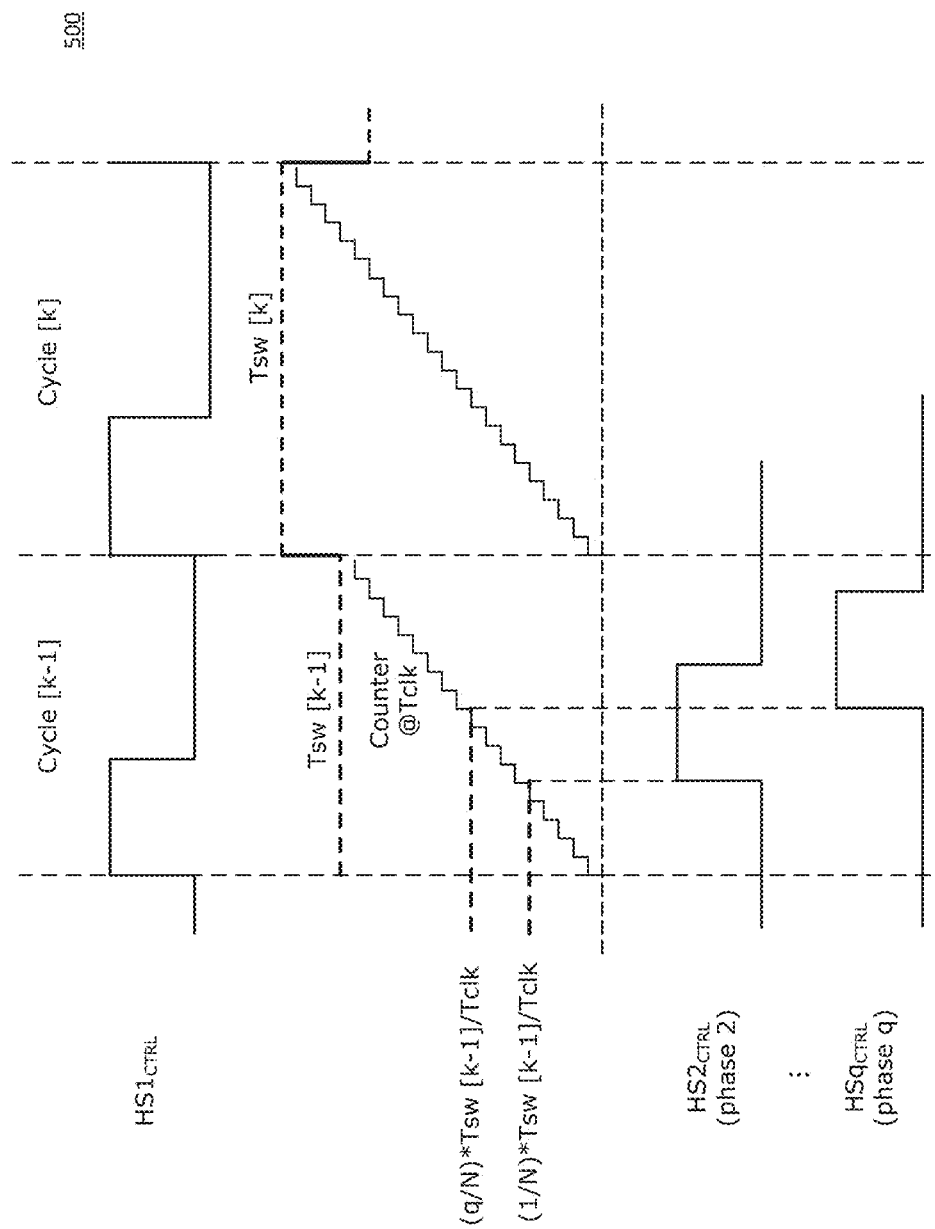
FIG. 5 illustrates PWM waveforms for controlling the high-side switch in each of multiple phases of a voltage converter such as that of FIG. 1.

FIG. 5 illustrates an extrapolation of the waveform of FIG. 4, which only considers the control signal for a single phase, for multiple phases of a multi-phase voltage converter. FIG. 5 illustrates waveforms 500 corresponding to high-side control signals $HS1_{CTRL}$, $HS2_{CTRL}$, . . . $HSq_{CTRL}$ for multiple phases of an N-phase voltage converter such as the voltage converter 100 of FIG. 1. As similarly described regarding the waveform of FIG. 4, a cycle period Tsw, together with a "$T_{ON}$" interval, are determined for a cycle (k−1) based upon measurements during cycle (k−2). This is illustrated by the PWM waveform $HS1_{CTRL}$, which represents the control signal for a high-side switch $Q_{HS}$ included as part of the first phase in the multi-phase voltage converter 100. This first phase may be considered as a "leading" phase, in that the timings for the other phases are driven from this phase. For a typical implementation, the start times for the other (non-leading) phases are evenly distributed throughout the cycle period Tsw[k−1]. Consider, for example, a voltage converter that has three (3) phases, wherein a cycle of the first (leading) phase begins at time to and has a cycle period of Tsw[k−1]. Then, the control signal $HS1_{CTRL}$ for the first phase would rise at time to, the control signal $HS2_{CTRL}$ for the second phase would rise at time to $+(\frac{1}{3})*Tsw[k-1]$, and the control signal $HS3_{CTRL}$ for the third phase would rise at time to $+(\frac{2}{3})*Tsw[k-1]$. The other control signals, e.g., for controlling low-side and SR switches, for the non-leading phases, would likewise be delayed versions of the control signals for the leading phase.

A counter having a clock period of Tclk is used to implement the cycle period Tsw[k−1], and to determine the transition times for the PWM control signals, e.g., $HS_{CTRL}$, $LS_{CTRL}$, $SR_{CTRL}$, for each of the phases in the multi-phase voltage converter 100. For the second phase of the N-phase voltage converter 100, the control signal $HS2_{CTRL}$ thus rises when the counter equals (1/N)*Tsw[k−1]/Tclk clock periods after the beginning of the switch cycle (k−1). For a $q^{th}$ phase, a control signal $HSq_{CTRL}$ rises when the counter equals ((q−1)/N)*Tsw[k−1]/Tclk clock periods after the beginning of the switch cycle (k−1). As described thus far, the switch cycle periods Tsw[k−1] are the same for all of the phases (leading and non-leading), but, as will be explained in detail later, the cycle period could by adjusted for the non-leading phases.

Figure 6:
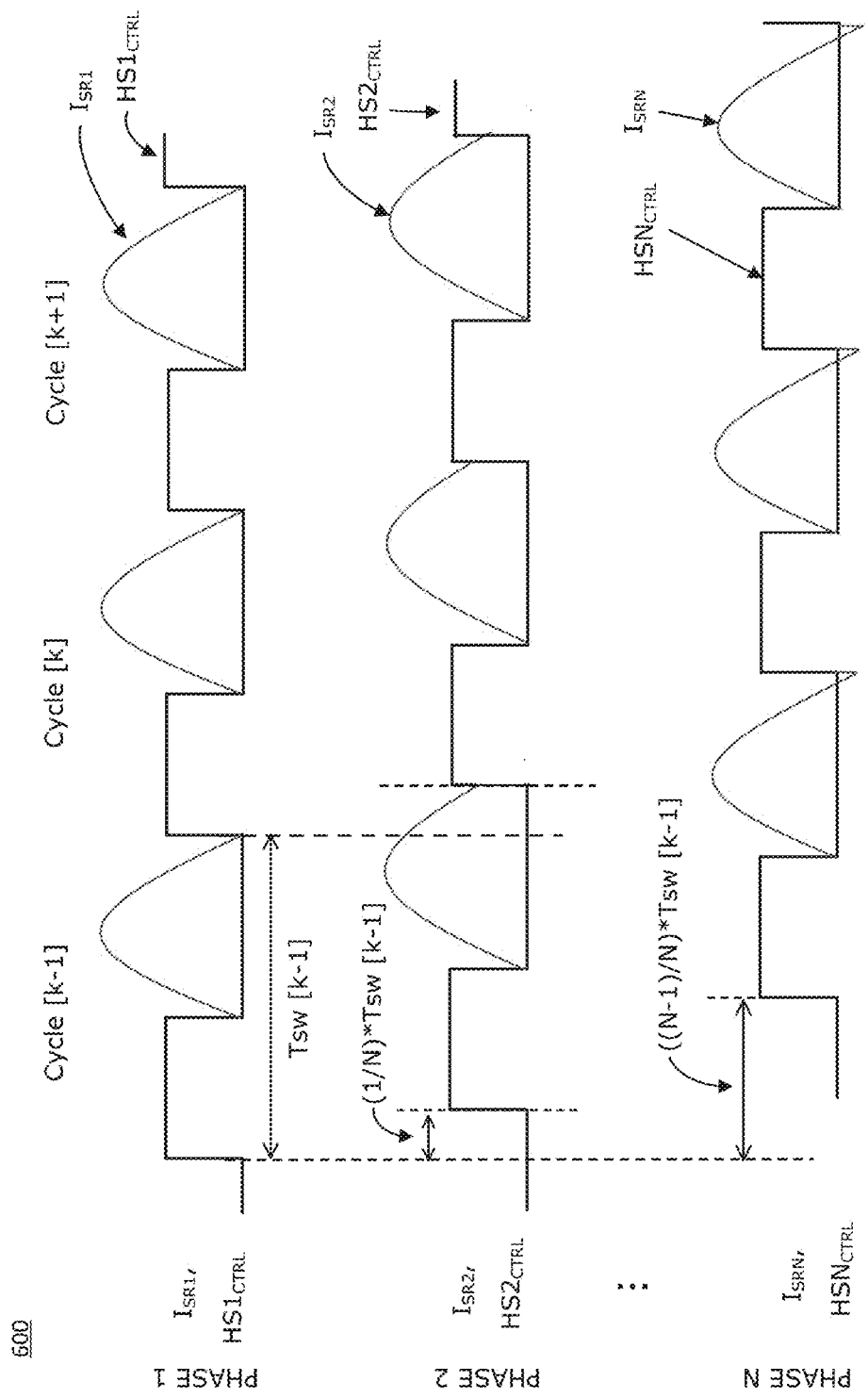
FIG. 6 illustrates PWM waveforms for controlling the high-side switches for each of multiple phases, and waveforms for the current through SR switches for each of multiple phases in a voltage converter such as that of FIG. 1.

FIG. 6 illustrates waveforms 600 associated with an N-phase voltage converter such as that shown in FIG. 1. Waveforms are illustrated for the PWM high-side control signals $HS1_{CTRL}$, $HS2_{CTRL}$, ... $HSN_{CTRL}$ of each phase. Superimposed on these are waveforms corresponding to the currents $I_{SR1}$, $I_{SR2}$, ... $I_{SRN}$ flowing through the SR switches $Q_{SR}$ for each of the phases. As similarly explained regarding FIG. 5, the high-side control signals $HS1_{CTRL}$, $HS2_{CTRL}$, ... $HSN_{CTRL}$ are staggered such that the signals corresponding to the non-leading phases (phases 2 to N) are delayed versions of the signal for the leading phase (phase 1). This is illustrated for phase 2, wherein the high-side control signal $HS2_{CTRL}$ for cycle (k−1) has a rising edge that is (1/N)*Tsw[k−1] later in time than the rising edge for the high-side control signal $HS1_{CTRL}$ for cycle (k−1). Similarly for phase N (the last phase), the high-side control signal $HSN_{CTRL}$ for cycle (k−1) has a rising edge that is ((N−1)/N)*Tsw[k−1] later than the rising edge for the high-side control signal $HS1_{CTRL}$ for cycle (k−1). The waveforms 600 of FIG. 6 presume that the switching period for a given cycle, e.g., Tsw[k−1], has been calculated in the preceding cycle, e.g., k−2, and that this switch period may be used both as the switch period and to determine the stagger (delay) times for starting the cycles of the non-leading phases. For ease of explanation, the switch periods illustrated in FIG. 6 do not change for the three (3) illustrated cycles k−1, k, k+1.

For a given phase, current flows through its SR switch, e.g., $Q_{SR}$, when the SR switch is conducting. The PWM control signal $SR_{CTRL}$ for an SR switch $Q_{SR}$ determines when that SR switch conducts. As explained in the description of FIG. 3, the PWM control signal $SR_{CTRL}$ only enables its corresponding SR switch during the off interval ("$T_{OFF}$") of the high-side switch $Q_{HS}$ for the phase. In FIG. 6, this corresponds to the time interval when a high-side control signal, e.g., $HS1_{CTRL}$, is low.

The currents flowing through the SR switches take on the shape of the upper half cycle of a sinusoid. This is readily seen in FIG. 6 for the current $I_{SR1}$ that flows through the SR switch $Q_{SR}$ for phase 1 of the voltage converter 100. For each cycle (e.g., k−1, k), the half-cycle sinusoidally-shaped current returns to zero at the beginning of the dead-time interval that immediately precedes the rising edge of the high-side PWM control signal $HS1_{CTRL}$. The rising edge of the high-side PWM control signal $HS1_{CTRL}$ signifies the start of the next cycle (e.g., k, k+1) of the voltage converter 100. (For ease of illustration, the "dead time" is not shown in FIG. 6, but it is understood that the PWM control signal $SR1_{CTRL}$ would actually disable the current $I_{SR1}$ at the start of a dead time interval during which none of the switches are conducting. The "dead time" is typically considerably smaller than the "$T_{ON}$" or "$T_{OFF}$" intervals described above.)

The control circuit 110 of the voltage converter 100 sets the PWM signal timings, e.g., $HS1_{CTRL}$, $LS1_{CTRL}$, $SR1_{CTRL}$, so that the SR switch $Q_{SR}$ of phase 1 is turned off at approximately the time when the current $I_{SR1}$ flowing through this SR switch $Q_{SR}$ is zero. The control circuit 110 may determine these timings using a measurement/estimation of the current $I_{SR}$, as input to the current sampler 218 illustrated in FIG. 2. The current $I_{SR1}$ may be measured by using the effective on-state resistance ($R_{dson}$) of the SR switch $Q_{SR}$ and the voltage across the SR switch $Q_{SR}$, or by using a current mirror. The current measurement, for $I_{SR1}$ or otherwise, may also be accomplished by using other standard means such as measuring the voltage across a sensing resistor, or by using direct current sensing (DCR) techniques.

The interval during which the half-cycle sinusoidal current $I_{SR1}$ is positive is determined by the components in the passive circuit 234 of the circuit 230 for phase 1 of the voltage converter 200, e.g., the values of the LC resonant tank given by $C_{RES}$, $L_{RES}$, the value of the magnetizing inductor $L_M$, and the inductance of the center-tapped inductor 236. Stated alternatively, the components of the passive circuit 234 have a resonant (natural) frequency that determines the time interval corresponding to the positive half-cycle sinusoidal current $I_{SR1}$. While this time interval may be calculated based on the component values, the component values will vary from circuit-to-circuit and, additionally, will vary according to the operating conditions (e.g., temperature) of the voltage converter 100. Hence, an empirical technique that makes use of a measurement of Ism, as described above, is preferred.

Consider, now, the passive circuits (corresponding to the passive circuit 134 of phase 1) for the other phases (e.g., phases 2 to N) of the voltage converter 100. The reactance in the passive circuits for these other phases will differ from that of phase 1, and, hence, these other passive circuits will have different resonant (natural) frequencies than the passive circuit 134 of phase 1. This means that the time interval for the half-cycle sinusoidal currents $I_{SR2}$, ... $I_{SRN}$ will differ from the time interval for $I_{SR1}$. This is shown in FIG. 6 where the time interval for the half-cycle sinusoid corresponding to the current $I_{SR2}$ through the SR switch $Q_{SR}$ for phase 2 is longer (slower) than that of phase 1. With the high-side control signal $HS2_{CTRL}$ of phase 2 being a delayed version of the high-side control signal $HS1_{CTRL}$ of phase 1, i.e., having the same $T_{ON}$ and $T_{OFF}$ intervals, this means that the control signal $SR2_{CTRL}$ turns off the SR switch $Q_{SR}$ for phase 2 while positive current $I_{SR2}$ is still being conducted. This is illustrated in FIG. 6 for each of the shown cycles k−1, k, k+1.

For phase N, the interval for the half-cycle sinusoid corresponding to the current $I_{SRN}$ through the SR switch $Q_{SR}$ is shorter (faster) than that of phase 1. Hence, the control signal $SRN_{CTRL}$ does not turn off the SR switch $Q_{SR}$ for phase N until after the current $I_{SR2}$ has crossed zero. This means that negative current is being conducted for the interval immediately before the SR switch $Q_{SR}$ for phase N is turned off, as shown in FIG. 6.

By generating PWM control signals $HS_{CTRL}$, $LS_{CTRL}$, $SR_{CTRL}$ based on a reference phase, e.g., phase 1, and measuring the current through the SR switches $Q_{SR}$ for each of the phases, the control circuit 110 is able to determine which of the phases are 'fast' and which are 'slow,' i.e., what the relative resonant frequencies of the different phases are. The control circuit 110 can then align the phases in order to reduce the current flow through each of the SR switches $Q_{SR}$ at the time instants when each of the SR switches $Q_{SR}$ are turned off. Ideally, the current flow $I_{SR}$ through an SR switch $Q_{SR}$ will be zero when the switch $Q_{SR}$ is turned off. In practice, a small amount of current (positive or negative) will be flowing when the switch $Q_{SR}$ is turned off. How close this current can be made to zero is determined by the resolution of the counter and its clock period Tclk.

In order to reduce the current flow to zero, or nearly to zero, through an SR switch $Q_{SR}$ for a non-leading phase (e.g., phase 2 ... N) when the SR switch $Q_{SR}$ is turned off, the duty cycles for the control signals $HS_{CTRL}$, $LS_{CTRL}$, $SR_{CTRL}$ are adjusted. For phase 2 in the example illustrated in the waveforms 600 of FIG. 6, the "$T_{ON}$" period of the signal $HS2_{CTRL}$ needs to be reduced so that the on period for the SR switch control signal $SR2_{CTRL}$ is increased. Conversely, for phase N, the "$T_{ON}$" period of the signal HSN$_{CTRL}$ needs to be increased so that the on period for the SR switch control signal SR2$_{CTRL}$ is reduced.

Figure 7:
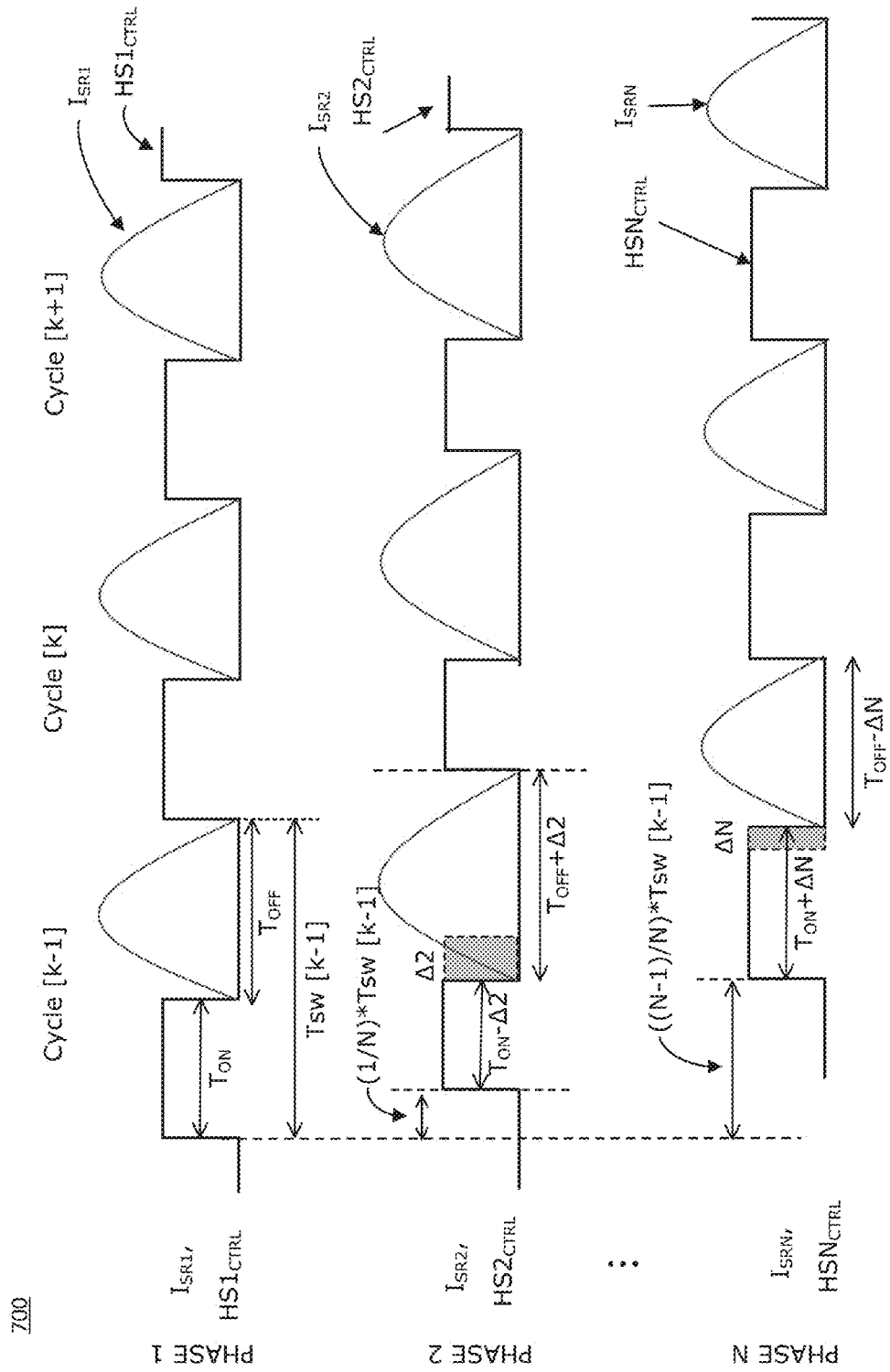
FIG. 7 illustrates PWM waveforms for controlling the high-side switches for each of multiple phases, and waveforms for the current through SR switches for each of multiple phases in a voltage converter such as that of FIG. 1 after the PWM duty cycles have been adjusted to achieve zero current switching through the SR switches in the non-reference phases.

FIG. 7 illustrates waveforms 700 corresponding to the (PWM) high-side switch control signals HS1$_{CTRL}$, HS2$_{CTRL}$, . . . HSN$_{CTRL}$ and the currents I$_{SR1}$, I$_{SR2}$, . . . I$_{SRN}$ flowing through the SR switches Q$_{SR}$ for each of the phases, after the control circuit 110 has adjusted the control signal timings to achieve zero current switching for the SR switches Q$_{SR}$. For phase 2, the control circuit 110 adjusts the T$_{ON}$ period for the high-side switch control signal HS2$_{CTRL}$ in cycle (k−1) by reducing the on period by a time increment Δ2 relative to that of the leading phase. To maintain the switch period Tsw[k−1], the off period for the high-side switch Q$_{HS}$ of phase 2 is increased by a time increment Δ2. The "on" period for the SR switch Q$_{SR}$ of phase 2 is determined by the "off" period of the corresponding high-side switch Q$_{HS}$, and is likewise increased. The control circuit 110 determines the amount of this increase Δ2 based upon the current through the SR switch Q$_{SR}$ at the end of its "on" period. This determination is made, at least initially, before any adjustments have been made to the timings in the non-leading phases.

For phase N, the control circuit 110 adjusts the T$_{ON}$ period in a converse manner. For the high-side control signal HSN$_{CTRL}$ in cycle (k−1), the "on" period is increased by a time increment ΔN relative to that of the leading phase. To maintain the switch period Tsw[k−1], the off period for the high-side switch Q$_{HS}$ of phase N is decreased by a time increment ΔN. The "on" period for the SR switch Q$_{SR}$ of phase N corresponds to the "off" period of the corresponding high-side switch Q$_{HS}$, and is likewise decreased. The control circuit 110 determines the amount of this decrease ΔN based upon the current through the SR switch Q$_{SR}$ for phase N at the end of its "on" period before any adjustments have been made to the timings in the non-leading phases, at least initially.

In summary, the control circuit 110 selects a reference (leading) phase for the voltage converter 100 and determines a switching period and duty cycle for a PWM control signal for the SR switch of the reference phase such that the SR switch is turned off (transitioned to its non-conducting state) when its current is zero. This switching period and duty cycle are then used for the non-reference phases. The duty cycles of the PWM control signals for the non-reference phases are then adjusted so that the SR switches of the non-reference phases are turned off at time instants when the currents through the non-reference SR switches are zero.

The adjustments to the duty cycles of the PWM control signals for the SR switches of the non-reference phases is performed by decreasing the duty cycle, relative to the corresponding duty cycle of the reference phase, for those phases wherein the current I$_{SR}$ returns to zero more quickly than does that of the reference phase. Conversely, for those non-reference phases having currents I$_{SR}$ that return to zero more slowly than that of the reference phase, the duty cycles of the PWM control signals for those SR switches are adjusted by increasing their duty cycles, relative to the corresponding duty cycle of the reference phase. The determination of which phases are faster or slower than the reference phase may be performed by comparing SR switch current measurements for the reference phase to current measurements for the other phases. Such SR switch current measurements are preferably made immediately before the corresponding SR switch is turned off.

The control circuit 110 may perform the control signal timing adjustments described above during a calibration mode for the voltage converter 100. These adjustments may then be applied during a normal operational mode. Preferably, however, the control signal timings described above are adaptively adjusted during normal operational mode. For example, the SR switch currents may be measured for each cycle period and PWM timing adjustment(s) may be made if needed. Such adaptive operation allows the phase alignment to maintain zero current SR switching even if the reactance of the passive circuits changes during operation.

In order to implement the variable switching frequency, e.g., by adjusting the switch periods, T$_{ON}$ intervals, and T$_{OFF}$ intervals for the switch cycles, the control circuit is operable to increment a counter at a defined frequency over the reference period for the immediately preceding switching cycle and to align the phases based on the counter output and the number of phases.

The prior explanations described a voltage converter in which the switch period Tsw[k] for the reference phase has already been determined at the beginning of a cycle k. This determined switch period can be used for setting the T$_{ON}$ and T$_{OFF}$ periods within cycle k, as well as for determining the start times for cycles of the non-reference phases that follow the timing of the reference (leading) phase. In order to more quickly react to load changes, a voltage converter may alter the switch period without waiting until the next start cycle of the reference phase. More particularly, the switch period Tsw[k] may be adjusted for non-reference phases in the middle of a cycle of the reference phase. However, the start of a switch period (e.g., for cycle k) for a non-reference phase is based upon the switch period from a previous cycle of the reference phase, e.g., Tsw$_{ref}$[k−1]. This will now be explained, by way of example, for a 2-phase voltage converter having waveforms as illustrated in FIG. 8.

Figure 8:
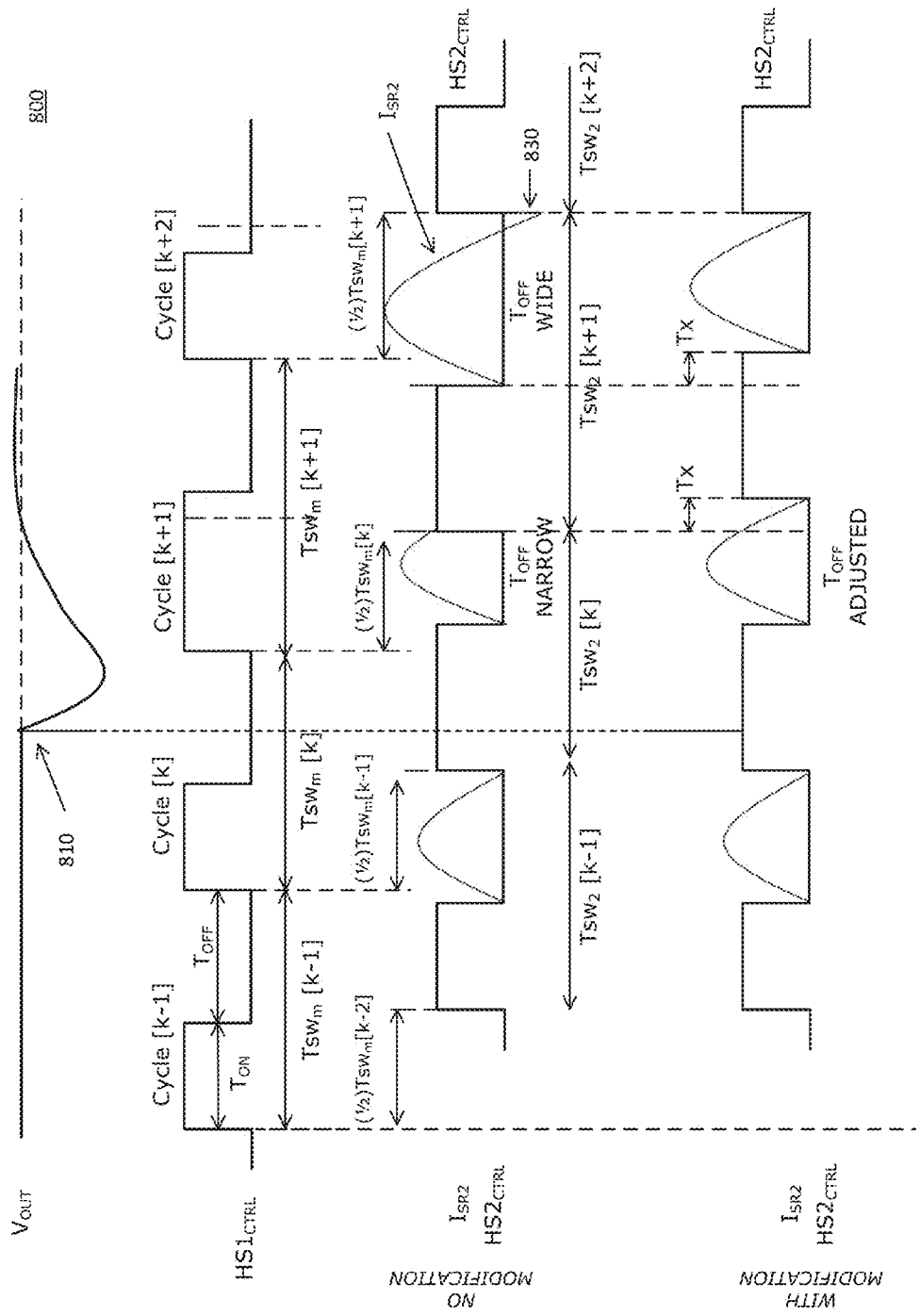
FIG. 8 illustrates PWM waveforms for controlling the high-side switches in a two-phase version of a voltage converter such as that of FIG. 1, and waveforms for the current through the SR switch of a non-reference phase, wherein the waveforms have been adjusted, in response to transient load changes, such that zero current switching through the SR switches is maintained.

FIG. 8 illustrates waveforms 800 associated with a load transient, and will be used for explaining sub-embodiments that avoid switching SR switches off when they have non-zero currents, as may occur due to load transients. For ease of illustration, the waveforms 800 are shown for a voltage converter having two (2) phases, but it should be understood that the techniques described below are readily extrapolated to voltage converters having more than two phases. The voltage converter generating the waveforms 800 of FIG. 8 may be a 2-phase version of the voltage converter 100 illustrated in FIG. 1. Phase 1 has been previously selected as the reference phase. The PWM control signals for both the reference phase (phase 1) and non-reference phase (phase 2) have been adjusted such that, during a steady-state operation of the voltage converter 100, the SR switches are switched off at time instants when the currents I$_{SR1}$, I$_{SR2}$ flowing through them is approximately zero.

A load transient (e.g., a sharp increase in the current required by a load 120 of the voltage converter 100) occurs at an instant of time 810, and is indicated by a drop in the output voltage V$_{OUT}$ of the voltage converter 100. This may be detected by the load transient detector 115 that monitors the output voltage V$_{OUT}$. As illustrated in FIG. 8, the load transient occurs during switching cycle k of phase 1 and phase 2. More particularly, the transient 810 occurs when phase 1 is in the T$_{OFF}$ interval of cycle k, whereas phase 2 is in the T$_{ON}$ interval of its cycle k. Note, however, that the described techniques are not restricted to cases in which transients occur with the timing shown in FIG. 8. The techniques are also applicable to other timings including, e.g., cases in which load transients occur during the T$_{ON}$ interval phase 1 and the T$_{OFF}$ interval of phase 2.

The duty cycle (T$_{ON}$ interval) of the switch period for the 2$^{nd}$ cycle of phase 2 is increased in response to the load transient. This increase is made so that the voltage converter 100 may supply more power to the load 120. This is shown in FIG. 8 where the $T_{ON}$ interval of the switch period $Tsw_2[k]$ is seen to increase relative to the $T_{ON}$ interval of the previous switch period $Tsw_2[k-1]$. However, the start of the next cycle (k+1) for phase 2 is triggered relative to the previous switch period of the reference phase. This means that the phase 2 switch period $Tsw_2[k+1]$ will begin at a point in time that is ½*$Tsw_m[k]$ after the start of the corresponding cycle for phase 1, i.e., the start of $Tsw_m[k+1]$. The net effect of this is that the switch period $Tsw_2[k]$ is prematurely ended before the SR switch current $I_{SR2}$ returns to zero. This is illustrated in FIG. 8 by the SR switch current $I_{SR2}$ during the period denoted "$T_{OFF}$, NARROW."

The next switch period of phase 2, i.e., $Tsw_2[k+2]$, is started at a point in time that is ½*$Tsw_m[k+1]$ after the start of cycle (k+2) for the reference phase. The load transient has increased the period for the reference phase at cycle (k+1), i.e., $Tsw_m[k+1]$ is longer than the previous period $Tsw_m[k]$. The net effect of this for phase 2 is that the beginning of the cycle (k+2) is delayed. For cycle (k+1) of phase 2, the switch period $Tsw_2[k+1]$ is too long and, more importantly, has an off interval (denoted by "$T_{OFF}$ WIDE") that allows the SR switch current $I_{SR2}$ to pass through zero and turn negative before the SR switch is turned off at time 830.

The effect of a step-up load transient, as described above, is that a misalignment is created for the non-reference phase 2 and, hence, the SR switch $Q_{SR}$ for phase 2 is switched off when either positive or negative current is flowing through it. It would be desirable to avoid these non-zero current flows when the SR switch is turned off.

The above problem is mitigated by detecting a step-up load transient, e.g., by using the load transient detector 115 within the control circuit 110 of the voltage converter 100, and adjusting the control signal timing in response to this detection. The resultant waveforms are shown in FIG. 8 beside the label "WITH MODIFICATION." Here, the start of the switch period $Tsw_2[k+1]$ is delayed by a time change denoted "Tx." This also increases the switch time period $Tsw_2[k]$. As shown, the $T_{OFF}$ period is thus increased, as denoted by "$T_{OFF}$ ADJUSTED," in order to allow adequate time for the SR switch current $I_{SR2}$ to return to zero before the SR switch is turned off. Additionally, this delayed start of $Tsw_2[k+1]$ effectively steals "Tx" time from the $T_{OFF}$ interval at the end of $Tsw_2[k+1]$. Hence, the $T_{OFF}$ interval that was previously too wide as denoted by "$T_{OFF}$ WIDE," is now correctly adjusted so that the SR switch current at the time instant 830 is no longer negative, i.e., zero current switching is achieved at this time instant 830.

The time delta Tx for delaying the start of a next switch cycle (and increasing the time period for a current switch cycle) is preferably set to the difference between the $T_{ON}$ intervals for $Tsw_2[k]$ and $Tsw_m[k-1]$. Alternatively, the time delay Tx could be set to a predetermined value.

FIG. 8 and the description above address the case of a step-up load transient, and explain how adjustments may be made to maintain phase alignment that achieves ZCS for the SR switches in the voltage converter 100. Conversely, the situation is reversed when a step-down transient is detected. For this case, the start of the next switch cycle for the non-reference phase would need to be advanced in time by a time delta Tx, which is the same as shortening the current switch cycle. The value for Tx may be given by the difference between the $T_{ON}$ intervals for $Tsw_2[k]$ and $Tsw_m[k-1]$, or it may be set to a predetermined value.

FIG. 9 illustrates an embodiment of a method 900 for aligning the phases in a multi-phase voltage converter, such as the voltage converter 100 of FIG. 1. The method may be implemented within a multi-phase voltage converter 100 as illustrated in FIG. 1, and uses techniques similar to those described above regarding the control circuit 110 of the voltage converter 100. The method 900 is used for controlling cycle-by-cycle switching of each phase by using pulse width modulation (PWM) control signals to control the power switches within a voltage converter. This includes PWM control signals for controlling a synchronous rectification (SR) switch within each phase, wherein the SR switch has a half-cycle sinusoidal current flowing through it when the SR switch is conducting. Each PWM control signal has a switching period and duty cycle.

The method 900 begins by selecting a reference phase from among the phases in a voltage converter 920. The selection may be arbitrary, or may be made after ranking the phases from fastest to slowest and then selecting a phase having a desired speed, e.g., the middle-most, as a reference phase. The switching period and duty cycle of the PWM control signal for the reference phase are then set so that the half-cycle sinusoidal-like current conducted by the SR switch of the reference phase crosses zero or nearly crosses zero when the SR switch is turned off during each switching cycle, i.e., so that zero-current switching (ZCS) is achieved 940. Next, the switching periods and duty cycles for the PWM control signals of the other phases are set to those of the reference phase 960. Finally, the duty cycles of the PWM control signals for the other phases are adjusted such that the half-cycle sinusoidal-like current conducted by the SR switches of the other phases eventually cross zero or nearly cross zero when the SR switches are turned off during each switching cycle 980, i.e., so that ZCS is achieve for the SR switches in the non-reference phases.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A multi-phase voltage converter, comprising:
a plurality of phases, each phase comprising a synchronous rectification (SR) switch through which a half-cycle sinusoidal-like current is conducted when turned on; and
a control circuit operable to:
control cycle-by-cycle switching of each phase via respective pulse width modulation (PWM) control signals, each PWM control signal having a switching period and duty cycle;
select one of the phases as a reference phase, wherein the switching period and duty cycle of the PWM control signal for the reference phase are set such that the half-cycle sinusoidal-like current conducted by the SR switch of the reference phase crosses zero or nearly crosses zero when the SR switch is turned off each switching cycle;

set the switching period and duty cycle of the PWM control signals for the other phases to that of the reference phase; and adjust the duty cycle of the PWM control signals for the other phases such that the half-cycle sinusoidal-like current conducted by the SR switches of the other phases eventually cross zero or nearly cross zero when the SR switches are turned off each switching cycle.

2. The multi-phase voltage converter of claim 1, wherein each of the phases further comprises:
a high-side switch connected between an input voltage terminal and a switching node;
a low-side switch connected between the switching node and ground; and
a passive circuit connecting the switching node to a common output node of the multi-phase voltage converter,
wherein the SR switch of the phase is connected between the passive circuit and ground.

3. The multi-phase voltage converter of claim 1, wherein the control circuit is operable to:
decrease the duty cycle of the PWM control signal for each of the other phases which is faster than the reference phase; and
increase the duty cycle of the PWM control signal for each of the other phases which is slower than the reference phase.

4. The multi-phase voltage converter of claim 3, wherein the control circuit is operable to compare current measurements for the reference phase to current measurements for the other phases to determine whether each of the other phases is faster or slower than the reference phase.

5. The multi-phase voltage converter of claim 4, wherein the control circuit is operable to identify an individual one of the other phases as being faster than the reference phase if the current measurements for that other phase decrease to zero in less time than the current measurements for the reference phase, and wherein the control circuit is operable to identify an individual one of the other phases as being slower than the reference phase if the current measurements for that other phase decrease to zero in more time than the current measurements for the reference phase.

6. The multi-phase voltage converter of claim 4, wherein the control circuit is operable to adaptively adjust the duty cycle of the PWM control signals for the other phases such that the current measurements for the other phases eventually cross zero or nearly cross zero when the PWM control signals for the other phases transition from an active state to an inactive state each switching cycle.

7. The multi-phase voltage converter of claim 1, wherein the control circuit is operable to align the other phases during the present switching cycle based on the switching period of the reference phase for the immediately preceding switching cycle.

8. The multi-phase voltage converter of claim 7, wherein the control circuit is operable to adjust the switching period of the other phases responsive to a transient condition at a load coupled to the multi-phase voltage converter so that the phases remain aligned during the transient condition.

9. The multi-phase voltage converter of claim 8, wherein the control circuit is operable to increase the switching period of the other phases by a first predetermined amount responsive to a step-up transient condition at the load so that the phases remain aligned during the step-up transient condition.

10. The multi-phase voltage converter of claim 8, wherein the control circuit is operable to decrease the switching period of the other phases by a second predetermined amount responsive to a step-down transient condition at the load so that the phases remain aligned during the step-down transient condition.

11. The multi-phase voltage converter of claim 1, wherein for each phase, the passive circuit comprises an LC tank coupled to the switching node of that phase and a transformer/tapped inductor for coupling the LC tank to an output capacitor of the multi-phase voltage converter, and the SR switch is coupled between the transformer/tapped-inductor and ground.

12. A method of phase alignment for a multi-phase voltage converter, each phase of the multi-phase voltage converter including a synchronous rectification (SR) switch through which a half-cycle sinusoidal-like current is conducted when turned on, the method comprising:
controlling cycle-by-cycle switching of each phase via respective pulse width modulation (PWM) control signals, each PWM control signal having a switching period and duty cycle;
selecting one of the phases as a reference phase, wherein the switching period and duty cycle of the PWM control signal for the reference phase are set such that the half-cycle sinusoidal-like current conducted by the SR switch of the reference phase crosses zero or nearly crosses zero when the SR switch is turned off each switching cycle;
setting the switching period and duty cycle of the PWM control signals for the other phases to that of the reference phase; and
adjusting the duty cycle of the PWM control signals for the other phases such that the half-cycle sinusoidal-like current conducted by the SR switches of the other phases eventually cross zero or nearly cross zero when the SR switches are turned off each switching cycle.

13. The method of claim 12, wherein adjusting the duty cycle of the PWM control signals for the other phases comprises:
decreasing the duty cycle of the PWM control signal for each of the other phases which is faster than the reference phase; and
increasing the duty cycle of the PWM control signal for each of the other phases which is slower than the reference phase.

14. The method of claim 13, further comprising:
comparing current measurements for the reference phase to current measurements for the other phases to determine whether each of the other phases is faster or slower than the reference phase.

15. The method of claim 14, wherein determining whether each of the other phases is faster or slower than the reference phase comprises:
identifying an individual one of the other phases as being faster than the reference phase if the current measurements for that other phase decrease to zero in less time than the current measurements for the reference phase; and
identifying an individual one of the other phases as being slower than the reference phase if the current measurements for that other phase decrease to zero in more time than the current measurements for the reference phase.

16. The method of claim 14, wherein adjusting the duty cycle of the PWM control signals for the other phases comprises:
adaptively adjusting the duty cycle of the PWM control signals for the other phases such that the current measurements for the other phases eventually cross zero or nearly cross zero when the PWM control signals for the other phases transition from an active state to an inactive state each switching cycle.

17. The method of claim 12, further comprising:
aligning the other phases during the present switching cycle based on the switching period of the reference phase for the immediately preceding switching cycle.

18. The method of claim 17, further comprising:
adjusting the switching period of the other phases responsive to a transient condition at a load coupled to the multi-phase voltage converter, so that the phases remain aligned during the transient condition.

19. The method of claim 18, wherein adjusting the switching period of the other phases responsive to a transient condition at the load comprises:
increasing the switching period of the other phases by a first predetermined amount responsive to a step-up transient condition at the load so that the phases remain aligned during the step-up transient condition.

20. The method of claim 18, wherein adjusting the switching period of the other phases responsive to a transient condition at the load comprises:
decreasing the switching period of the other phases by a second predetermined amount responsive to a step-down transient condition at the load so that the phases remain aligned during the step-down transient condition.

* * * * *